April 28, 1942.   J. LITHGOW ET AL   2,280,961
CONTROL MECHANISM FOR AN ABSORPTION REFRIGERATOR
Filed Aug. 25, 1939   2 Sheets-Sheet 1
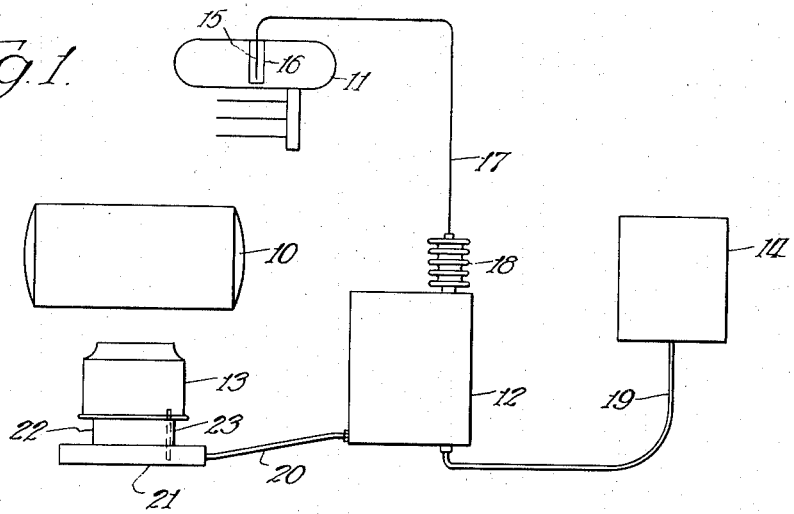
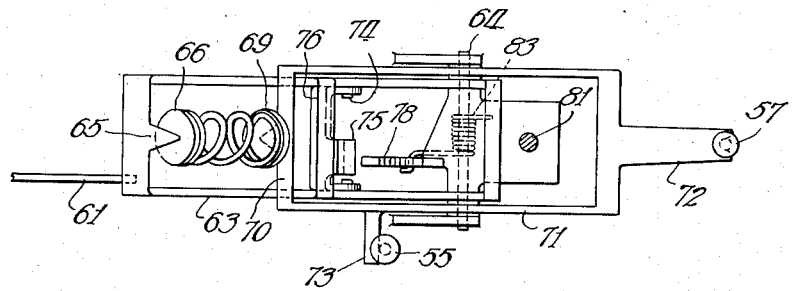
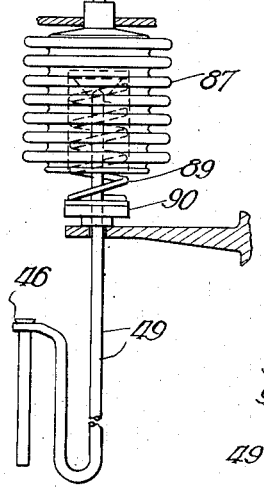
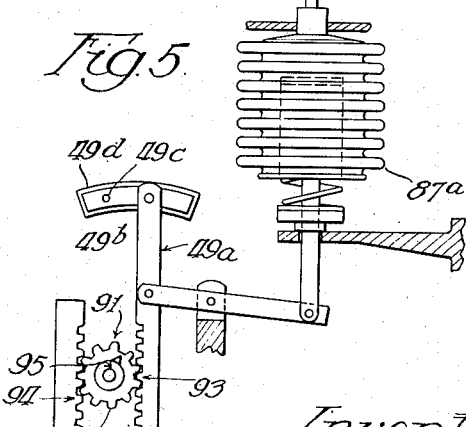
Inventors
John Lithgow
Leslie K. Jackson
By Ira H. Marks, Atty.

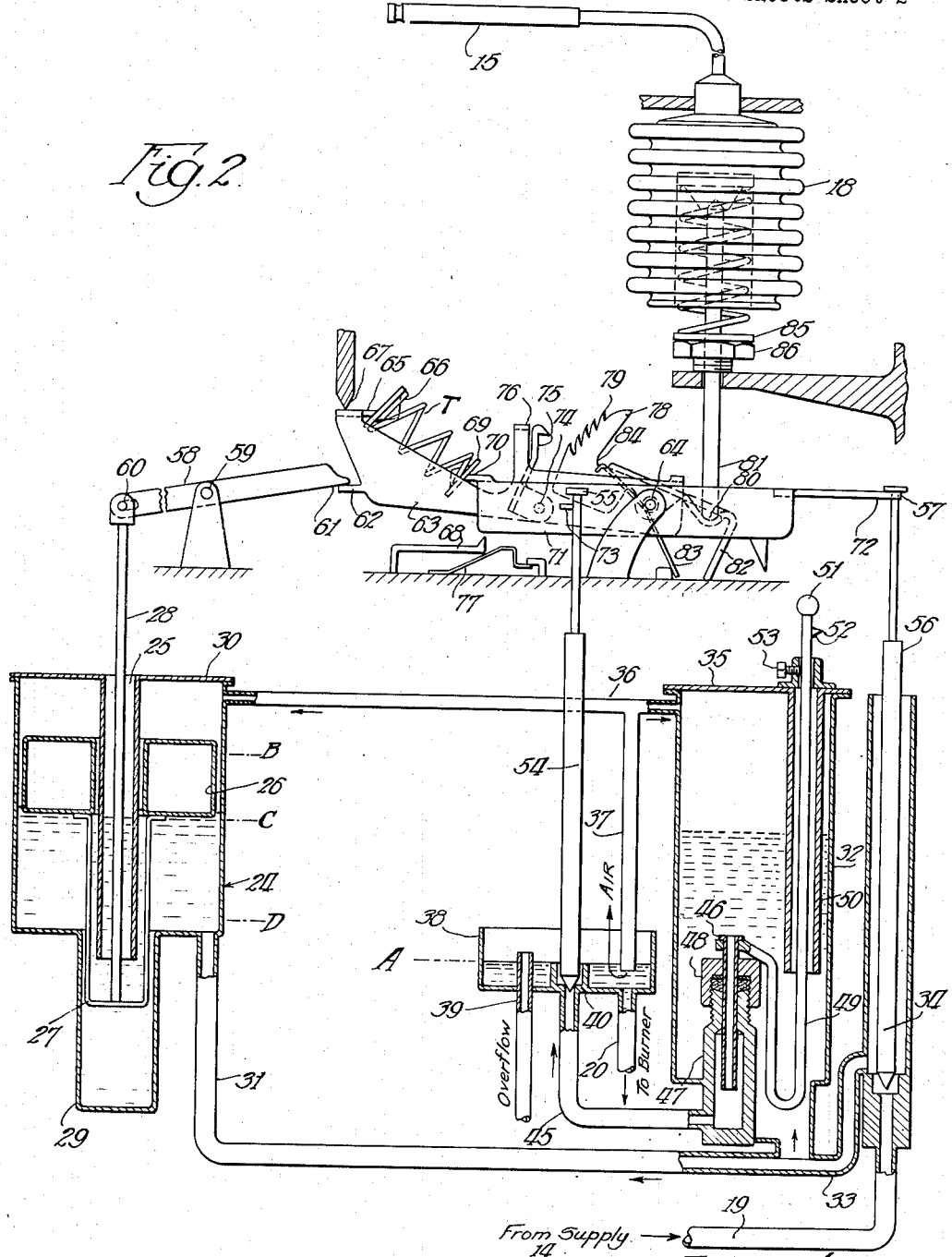

Patented Apr. 28, 1942

2,280,961

UNITED STATES PATENT OFFICE 2,280,961

CONTROL MECHANISM FOR ABSORPTION REFRIGERATORS

John Lithgow and Leslie K. Jackson, Cleveland, Ohio, assignors to Sears, Roebuck and Co., Chicago, Ill., a corporation of New York Application August 25, 1939, Serial No. 291,986

12 Claims. (Cl. 62—5)

Our invention relates to an intermittent absorption refrigeration system. More particularly our invention relates to a control mechanism especially adapted to control the heating period of an intermittent absorption system.

The control mechanisms heretofore known in the art for the intermittent absorption refrigerator comprised, as a rule, a thermostatic element or bulb located within the generator-absorber and a second thermostatic bulb in the evaporator of the system. In some instances the action of the generator and evaporator bulbs was modified or varied by a third thermostatic bulb which was exposed to the temperature of the room in which the refrigerator was located, this third controlling element being known in the art as an ambient control.

It has been our experience that a control system of this character involving three gas or liquid filled bulbs was generally troublesome. In the first place, the greater the number of bulbs, the greater the possibility of service calls to replace one or more of the same. Thermostatic bulbs of this character sometimes lose gas after long periods of use or during handling and must be refilled or replaced. The most troublesome bulb was generally that connected to the ambient control. The next most troublesome in actual practice was the generator bulb which was necessarily subjected to a high temperature in the generator of the unit. Where a generator bulb was used, it was necessary to provide a well in the generator for the reception of the same and very frequently this well becomes clogged so thoroughly as to prevent the removal of the same. The generator control bulb was used to turn off the burner at the close of the heating period. This turn off depended on the rise of generator temperature, with the decrease in concentration of the refrigerant as compared to the absorbent, the refrigerant usually being a low boiling fluid such as ammonia dissolved in an absorbent such as water. This control was not very critical since the curve of temperature rise with decrease of ammonia concentration flattens out as higher temperatures are reached and it was, therefore, necessary that the generator controlling element be extremely critical since in some instances an hour or more of operation was effective to produce a rise in temperature of only a few degrees. Under these circumstances, in many instances a burner having a generator control set for a 100° room will never turn off in a 60° room, because the burner of the unit is incapable of producing the temperature rise necessary to effect the generator bulb. The most obvious solution to this problem, i. e., the provision of a larger burner, is highly impractical since in an intermittent system of this type the use of a very large burner means a corresponding increase in the rate of ammonia evolution and necessitates an increase in the dehydrator and condenser heat radiating ability.

The ambient control, when used, was also sharply critical. In many instances an ambient control slightly out of adjustment would mean a variance in burning time of from 1 to 5 hours. Since in a normal unit the burning period for a 100° room is about two hours and that for a 60° room one hour, it can be seen that such a variance would completely destroy the efficient operation of the mechanism. A further disadvantage resulting from the use of a generator controlling bulb was that if the generator bulb was defective, the burner would burn continuously or until all the fuel in the fuel tank was used up. This would result in a lack of refrigeration for a considerable length of time. Some types of controls attempt to control box temperature by having an adjustment on the evaporator bellows mechanism, whereby it will "turn on" at a higher or lower temperature. This provision is ineffective to control the temperature in the refrigeration space in general as it simply resulted in a shorter and greater number of refrigerating periods and generating periods with very slight variations in actual box temperature. Prior art controlling mechanisms also resorted to a float to control the level and rate of fuel in the supply leading to the burner, or, as an alternative, a needle valve to vary the rate of fuel supply. Both of these devices were prone to get out of order and necessitated frequent service and adjustments.

It is one of the objects of our invention, therefore, to provide a control for an intermittent absorption refrigerating unit which is effective to positively control the amount of fuel supplied to the burner in order to limit the burning thereof and the consequent length of the generating period.

Another object of our invention is to provide a controlling mechanism for an intermittent refrigeration system having only a single thermostatic bulb or regulator.

A third object of our invention is to provide a positive manual control for the amount of fuel supplied to the generator of an intermittent refrigeration system in order to vary the temperature of the refrigeration space.

Another object is to provide a thermostatic controlling mechanism having a thermostatic means to control the flow of fuel to a metering means which in turn controls the amount of fuel supplied to the burner.

Still another object is the provision of a thermostatic means in heat exchange relationship with the evaporator of an intermittent absorption system and effective to control the supply of fuel to a metering means.

Another object of our invention is to provide a metering means capable of feeding a regulated amount of fuel to a burner.

A further object is to provide a control system for an intermittent absorption refrigerator which supplies a predetermined quantity of liquid fuel to the burner of the system upon a predetermined increase of temperature in the evaporator.

Another object is to provide a feed regulating mechanism for a burner which depends on limitation of the air supplied to a closed chamber for regulating effect.

A further object is to provide an emergency overflow for the fuel system and burner forming a part of the control mechanism.

Another object is to provide an ambient control effective to vary the fuel supply to the burner.

Various other objects and advantages of our invention will be apparent from the subsequent description and drawings.

Referring to the drawings forming part of this specification and illustrating a preferred embodiment of our invention:

Fig. 1 is a diagrammatic illustration of the control, fuel supply tank, burner and evaporator of the unit.

Fig. 2 is an elevation, partly in section, of the control according to our invention.

Fig. 3 is a plan view of the control.

Fig. 4 is an illustration of a modification of our invention embodying an ambient control.

Fig. 5 is a detail of a further modification wherein a combined ambient and manual control is illustrated.

Referring to Fig. 1, the reference numeral 10 indicates a generator which is properly connected in operative relation to an evaporator 11. It is to be understood that the particular connections and apparatus normally present between the generator and evaporator, such as a condenser, dehydrator, etc., forms no part of the present invention and it is, therefore, not deemed necessary to illustrate the same. It is to be understood that during the generating period ammonia is volatilized from the generator, condensed and supplied to the evaporator in a suitable manner and that in the refrigerating or absorption period the condensed ammonia is evaporated in the evaporator and flows back to the generator by means of suitable conduits. It is to be further understood that this evaporation of ammonia in the evaporator is effective to cool a suitable refrigeration space surrounding the evaporator. Referring once again to Fig. 1, the control in general is indicated by reference numeral 12, the burner, supplied with a suitable pilot, by reference numeral 13 and a source of fuel such as a kerosene tank or the like at 14.

A thermostatic bulb 15 is located in a suitable well 16 in the evaporator 11 and is connected by a conduit 17 with a bellows 18 forming part of the control proper, as will be hereinafter described in detail. A fuel supply conduit 19 connects the bottom of the kerosene tank 14 with the control 12, and a second supply line 20 connects the burner reservoir 21 with the control 12. The top of the burner reservoir communicates by means of a main supply line 22 with the wick channel of the burner. The pilot wick 23 of the burner communicates with the bottom of the burner reservoir 21 by means of conduit 23.

Referring specifically to Fig. 2, it will be seen that the control mechanism comprises a metering chamber 24 provided with a well 25 extending to a considerable distance below the liquid level therein, at its lower end, and open to the atmosphere at its upper end. Within the metering chamber 24 there is provided a float 26 which surrounds the well 25 and is freely movable in an upward and downward direction within the metering chamber 24. Extending from the bottom of the float 26 and suitably fastened thereto is a bridge or yoke member 27 which carries a rod 28 extending from the yoke member up through the well 25. The yoke member and rod 28 reciprocates within the well 29 whenever the float 26 rises or falls. The metering chamber 24 is provided with a cover 30 which is adapted to form an air-tight closure for the top of the metering chamber. A fuel outlet 31 communicates with the bottom of the metering chamber at one end and with the bottom of a chamber 32 at its other end. The conduit 31 also communicates with a conduit 33 which leads through the valve 34 to the fuel supply tank 14 by means of conduit 19. The chamber 32 is also provided with an air-tight cover 35. The top of chamber 32 communicates by means of a conduit 36 with the top of the metering chamber 24. A branch 37 of the conduit 36 leads downwardly and communicates with a leveling trough 38 at a point spaced from the bottom thereof for a purpose to be hereinafter set forth. The trough 38 communicates with the burner 13 through conduit 20.

The trough 38 is provided with an overflow conduit 39 opening into the trough above the normal liquid level. This overflow conduit functions to prevent too high a fuel level in the burner, since the burner is so positioned that the normal functioning level of the fuel in the burner is that indicated at A. The bottom of the trough 38 is provided with a valve 40 opening into a conduit 45 leading to the tank 32 through a regulating spout 46. The regulating spout 46 is movable in a vertical direction within a casing 47, being connected to the casing by means of a packing member 48 which is effective to maintain a liquid-tight connection between the spout 46 and the casing 47. The spout can be moved in a vertical direction by means of a connecting member 49 extending upwardly to the outside of the chamber 32 through a well 50. The connecting member is provided at its upper end with a suitable knob 51 and a pointer 52. The connecting member and the spout are maintained in any selected vertical position by means of the set screw 53 cooperating with the connecting member. The valve 40 is provided with a valve stem 54 having an operating shoulder 55 at its upper end and the valve 34 is provided with a valve stem 56 having an operating shoulder 57 at its upper end.

The operation of the metering or control device just described is as follows. At the start of the operation, the valve 34 is open and the valve 40 is closed. Fuel is supplied from the reservoir 14 through the fuel line 19, the valve 34, the conduits 33 and 31, to the metering chamber 24. The supplying of fuel to the metering chamber causes the level therein and the float 26 to rise until the level E is reached. When the level B is reached, the movement of the float 26 and the yoke 27 attached thereto moves the rod 28 in an upward direction and through a suitable linkage to be hereinafter described, functions to move the valve stem 56 in a downward direction to close the valve 34, at the same time moving the valve stem 54 in an upward direction to open the valve 40. The closing of the valve 34 shuts off the fuel supply line 19 and stops the flow of fuel from the tank 14 to the metering chamber 24. The opening of the valve 40 causes a flow of fuel through the conduit 45 to the trough 38. From the trough 38, the fuel then flows through the conduit 20 to the burner reservoir 21. It is to be understood that the burner reservoir 21 is located below the trough 38 and that the desirable level of fuel in the wick channel of the burner 13 as before stated, is that indicated by the letter A in Fig. 2. It is to be further understood that at the beginning of the burning or generating period the pilot 23 has lowered the level of the fuel in the reservoir and burner to a point considerably below the level A and uncovered the lower end of the vent conduit 37 so that as the fuel flows out of the metering chamber 24 and the chamber 32, air is supplied through the conduits 36 and 37. Whenever the level of fuel in the burner rises to the level A, the end of the air vent conduit 37 is covered and no air can then enter the closed chambers 24 and 32. The sealing of the air vent 37 provides a check to the flow of fuel by creating a slight vacuum over the liquid in the chambers 24 and 32 and holds the liquid in these chambers until the vacuum is released by the reopening of the air vent 37 due to consumption of fuel by the burner. This action of the trough and air vent arrangement serves to regulate the supply of fuel to the burner wick and helps to maintain the burner operation at a fairly even rate until all of the fuel in the metering chamber 24 above the top of the spout 46 has been exhausted. When a level equivalent to the top of spout 46 has been reached, as shown at D, the fuel ceases to flow to the burner and the generating period is over. The refrigerant distilled over and condensed is supplied to the evaporator and evaporated therein, producing cold in the evaporator and the refrigerating chamber. When the refrigerant in the evaporator is exhausted, the temperature of the evaporator rises. This higher temperature causes the expansion of the fluid in the controlling bulb 15. The expansion of this fluid causes a corresponding expansion of the bellows 18, and this expansion of the bellows through a suitable linkage is operative to open the valve 34 and close the valve 40 to effect another heating or generating period.

The amount of fuel available in the metering chamber 24 is determined by the height of the spout or tube 46. In Fig. 2 the tube 46 is at its low level so that the top or inlet thereof is equivalent to the level D. In this setting all of the fuel between the levels B and D of the metering chamber will be available and supplied to the burner through the tube 46, conduit 45 and supply line 20. By manipulation of the handle 51, the top of the tube 46 may be moved to a position equivalent to level C, and, in this event, the fuel available will be that between the levels B and C. The control therefore may be manually set to supply a greater or less amount of fuel to the burner 13 with a corresponding increase or decrease in refrigeration effect.

In the modification of the device shown in Fig. 4, an "ambient control" is provided to take the place of the manual control. In this modification, the upper portion of the rod 49 is connected to a bellows 87. The bellows 87 is in fluid communication with a thermostatic bulb 88 which is exposed to the temperature of the air outside the refrigerator. Downward movement of the bellows 87 and the rod 49 is opposed by a spring 89 which can be varied in tension by means of an adjusting nut 90. In this modification, therefore, the amount of fuel available will be increased when room temperatures are at a higher level. In other words, the expansion of the bellows 87 will move the rod 49 in a downward direction. The corresponding movement of the tube 46 will increase the amount of fuel available to the burner 13 from the metering chamber 24.

In the modification shown in Fig. 5, the rod 49 is shown coupled to a rod 49a by means of a gear and rack arrangement indicated in general at 91. The gear wheel 92 cooperates with a rack 93 on rod 49a and a similar rack 94 on rod 49 to vary the effective connection therebetween. The rod 49a is connected to an ambient bellows 87a operated by a thermostatic bulb 88a in a manner similar to the operation of the bellows 87 by the bulb 88 in Fig. 4. By means of the gear wheel 92, however, the rod 49 may be moved upwardly or downwardly. The gear wheel 92 is moved by the manually operated knob 95, so that there is here disclosed a controlling mechanism capable of varying the burning period of the burner both manually and in response to an ambient control. The device is shown as it would be when operating under ambient control, with lever 49a positioned at 49b on member 49d. Lever 49a would be moved to position 49c on member 49d, in order to disengage rack from gear and permit the control to be operated manually.

The particular linkage used in effecting the operation of the valves of the present device in one direction by the evaporator bulb and bellows and in the other direction by the float 26 is not limiting in so far as our present invention is concerned, as other linkages may be employed in connection with the control device. Another type of linkage which we have found to be particularly effective in this connection is disclosed in the co-pending application of John Lithgow, Leslie K. Jackson and Ernest J. Dillman, Serial No. 297,958 filed October 4, 1939.

Referring briefly to the operating linkage disclosed in Figs. 2 and 3, a lever arm 58 pivoted at 59 is connected at one end as by pin and slot connection 60 with the rod 28 and at the other end carries an operating nose 61. The nose 61 cooperates with a lug 62 on a toggle lever 63. The toggle lever 63 is pivoted on a pin 64 and carries a pivot member 65 fitting into one end of a toggle spring cap 66. The toggle lever 63 is capable of reciprocatory movement about its pivot which is limited by the stops 67 and 68. The end 69 of the toggle spring T is carried by a pivoting member 70 on one end of a bridge lever 71. This bridge lever is also pivoted on the pin 64 and extends above and to each side of the lever 63. Formed at the one end of the bridge lever 71 is a nose 72 which cooperates with the shoulder 57 of the valve stem 56. A lug 73 is carried by the bridge lever at a point intermediate the pivot member 70 and the pin 64. The lug 73 cooperates with the shoulder 55 of the valve stem 54, and when moved in an upward direction, contacts the shoulder 55 to open the valve 40. In a similar manner, the nose 72, when moved in an upward direction, moves the valve stem 56 through the medium of the shoulder 57 to open the valve 34. It is to be understood that each of the valve stems will normally tend to move to a closed position because of gravity or by means of some suitable assisting spring. Pivoted on the toggle lever 63 at the point 74 is a pawl 75 which is freely movable in a forward and downward direction and is limited in its rearward movement by the ledge or shoulder 76 formed on the toggle lever 63. A spring 77 is also provided which is contacted by the lower surface of the pawl 75 on downward movement of the toggle lever 63 and is effective to swing the pawl about the pivot 74 in a clockwise direction. Pivoted on the pin 64 is a rack sector member 78. The member 78 carries a plurality of teeth 79 on one end thereof and a seat 80 adapted to receive a rod 81 on the other end. This end of the member 78 also carries a downwardly bent limiting member 82. A spring 83 wound about the pin 64 bears at one end in the notch 84 of the member 78 and serves to maintain the seat 80 firmly against the rod 81. The upper end of the rod 81 bears against one end of the bellows 18, and the expansion of the bellows and the movement of the rod in a downward direction is resisted by the spring 85. The tension of the spring 85 may be varied by the adjusting nut 86.

The operation of the linkage just hereinbefore described is as follows. In the position shown in Fig. 2, the valve 34 is open and the valve 40 is closed. Fuel is then being supplied to the metering chamber 24. The left hand end 66 of the toggle spring T is then in its extreme upward position, and the toggle lever 63 bears against its upper stop 67. The bellows 18 is expanded and the rack sector member is in its extreme clockwise position. Fuel is thus being fed into the metering chamber 24. When the level of liquid in the metering chamber 24 has reached the point indicated by letter B the action of the float 26 on the yoke 27 and rod 28 will move the left hand side of the lever 58 in an upward direction and the nose 61 in a downward direction sufficiently so that the left hand side 66 of the toggle spring T will be moved past dead center by the pivot member 65. This movement of the toggle spring T past dead center will cause the right hand side 69 of the toggle spring to jump upwardly. This movement of the right hand side of the toggle spring will move the left hand end of the bridge lever 71 in an upward direction through the pivot member 70, thus allowing valve stem 56 to move downwardly to close the valve 34 and causing the valve stem 54 to move upwardly by means of lug 73 and open the valve 40. At the same time, the movement of the toggle lever 63 downwardly will carry the pawl 75 downward and cause the bottom edge of the pawl to contact spring 77, forcing the pawl to rotate in a clockwise direction and its end to engage the member 78. This action will supply fuel to the burner 13 and cause refrigerant to be distilled over, condensed and supplied to the evaporator 11.

When the supply of fuel available in the metering chamber 24 is exhausted, the burner will go out and evaporation will take place in the evaporator 11. This evaporation will chill the bulb 15 and cause the bellows 18 to contract. This contraction of the bellows 18 aided by the spring 85 and spring 83 will move the rod 81 upwardly. This movement of the rod upwardly will permit the rotation of the rack sector member 78 in a counterclockwise direction about the axle 64. During this movement the end of the pawl 75 will slide over the teeth 79 carried by the rack sector member 78.

When the supply of refrigerant in the evaporator is exhausted, the temperature thereof will rise. This rise in temperature will expand the fluid in the thermostatic bulb 15 and in the bellows 18 against the action of the spring 85. This expansion of the bellows will move the rod 81 downwardly and since the rod is seated in the seat 80 formed in the right hand end of the member 78, it will impart a clockwise movement or rotation to the member 78. This movement of the member 78 will cause one of the teeth 79 to cooperate with the end of the pawl 75 to correspondingly move the pawl in an upward direction. The movement of the pawl in an upward direction will move the bridge lever 71 similarly and will also carry the right hand end of the toggle spring T in an upward direction. When the right hand end of the toggle spring T is carried past dead center, a quick downward movement will be imparted to the left hand end thereof and correspondingly to the pivot member 65 and the left hand end of toggle lever 63. This movement of the bridge lever and toggle lever will be effective to open the valve 34 and allow the valve 40 to close and will start a new cycle of operation, as hereinbefore explained. The adjustment of the tension of the spring 85 by the nut 86 will increase the resistance of the spring to the expansion of the bellows 18 and will serve to raise the temperature at which the bellows will be effective to initiate the movement just described.

It is desired to specifically point out that although two valves are disclosed, this is merely for the sake of simplicity of explanation and that a single valve having two cores may be employed, as is shown in the copending application Ser. No. 297,958, hereinbefore mentioned. It is also within the broad scope of our invention to employ any suitable type of valve. Thus, instead of a valve capable of upward and downward closing movement, a rotatable valve may be used or any other type well known to those skilled in the art.

It is to be further noted that although the chambers 24 and 32 are shown as separate chambers connected by the conduits 31 and 36, this is merely for the sake of clarity of explanation, and they may advantageously be formed as a single chamber.

Various modifications and changes coming within the spirit of our invention may suggest themselves to those skilled in the art, and, hence, we do not wish to be limited to the specific forms shown or uses mentioned except to the extent indicated in the appended claims, which are to be interpreted as broadly as the state of the art will permit.

We claim:

1. In combination with a refrigeration device of the intermittent absorption type, including an evaporator and a generator heated by a liquid fuel burner, a metering means, a fuel supply connected to said metering means by a fuel supply line, a valve interposed in the fuel supply line, means to connect the metering means to the burner, including a second valve, means responsive to a predetermined increase in temperature in said evaporator to open said first valve to supply fuel to the metering means, and means operated by said metering means to close the first mentioned valve and open the second mentioned valve to supply a measured quantity of fuel to the burner.

2. In combination with a refrigeration device of the intermittent absorption type, including an evaporator and a generator heated by a liquid fuel burner, a metering means, a fuel supply connected to said metering means by a fuel supply line, a valve interposed in the fuel supply line, means to connect the metering means to the burner including a second valve, means responsive to a predetermined increase in temperature in said evaporator to open said first valve to supply fuel to the metering means, means operated by said metering means to close the first mentioned valve and open the second mentioned valve to supply a measured quantity of fuel to the burner, and means to regulate the rate of fuel supply to the burner from said metering means.

3. In combination with a refrigeration device of the intermittent absorption type, including an evaporator and a generator heated by a liquid fuel burner, a metering means, a fuel supply connected to said metering means by a fuel supply line, a valve interposed in the fuel supply line, means to connect the metering means to the burner including a second valve, means responsive to a predetermined increase in temperature in said evaporator to open said first valve to supply fuel to the metering means, means operated by said metering means to close the first mentioned valve and open the second mentioned valve to supply a measured quantity of fuel to the burner, and means to vary the amount of fuel available in the metering means.

4. In a heating device, a liquid fuel burner, a metering means, a fuel supply connected to said metering means by a fuel supply line, a valve interposed in the fuel supply line, means to connect the metering means to the burner, a second valve interposed in said last mentioned means, a thermostatic means responsive to a predetermined temperature change to open said first valve to supply fuel to the metering means, and means operated by said metering means to close the first valve and open the second to supply a measured quantity of fuel to the burner.

5. In a heating device, a liquid fuel burner, a chamber having a predetermined volume, a fuel supply connected to said chamber by a fuel supply line, a valve interposed in the fuel supply line, means to connect the chamber to the burner, a second valve interposed in said last mentioned means, a thermostatic means responsive to a predetermined temperature change to open said first valve to supply fuel to the chamber, and means actuated by a predetermined level of fuel in the chamber to close the first valve and open the second to supply a measured quantity of fuel to the burner.

6. In a heating device, a liquid fuel burner, a metering chamber having a predetermined volume, a fuel supply connected to said metering chamber by a fuel supply line, a valve interposed in the fuel supply line, means to connect the metering chamber to the burner, a second valve interposed in said last mentioned means, a thermostatic means responsive to a predetermined temperature change to open said first valve to supply fuel to the metering chamber, means actuating by a predetermined level of fuel in the metering chamber to close the first valve and open the second to supply a measured quantity of fuel to the burner, and means to vary the effective level of fuel in the metering chamber.

7. In a heating device, a liquid fuel burner, a metering means, a fuel supply connected to said metering means by a fuel supply line, a valve interposed in the fuel supply line, means to connect the metering means to the burner, a second valve interposed in said last mentioned means, a thermostatic means responsive to a predetermined temperature change to open said first valve to supply fuel to the metering means, means operated by said metering means to close the first valve and open the second to supply a measured quantity of fuel to the burner, and means to regulate the rate of fuel supply to the burner from said metering means.

8. In combination with a refrigeration device of the intermittent absorption type, including an evaporator and a generator heated by a liquid fuel burner, a metering means, a fuel supply connected to said metering means by a fuel supply line, a valve interposed in the fuel supply line, means to connect the metering means to the burner including a second valve, means responsive to a predetermined increase in temperature in said evaporator to open said first valve to supply fuel to the metering means, means operated by said metering means to close the first mentioned valve and open the second mentioned valve to supply a measured quantity of fuel to the burner, and means to vary the amount of fuel available in the metering means comprising a movable inlet interposed in the connecting means between the metering means and the burner.

9. In combination with a refrigeration device of the intermittent absorption type, including an evaporator and a generator heated by a liquid fuel burner, a metering means, a fuel supply connected to said metering means by a fuel supply line, a valve interposed in the fuel supply line, means to connect the metering means to the burner including a second valve, means responsive to a predetermined increase in temperature in said evaporator to open said first valve to supply fuel to the metering means, means operated by said metering means to close the first mentioned valve and open the second mentioned valve to supply a measured quantity of fuel to the burner, means to vary the amount of fuel available in the metering means comprising a movable inlet interposed in the connecting means between the metering means and the burner, and manual means to move said inlet.

10. In combination with a refrigeration device of the intermittent absorption type, including an evaporator and a generator heated by a liquid fuel burner, a metering means, a fuel supply connected to said metering means by a fuel supply line, a valve interposed in the fuel supply line, means to connect the metering means to the burner including a second valve, means responsive to a predetermined increase in temperature in said evaporator to open said first valve to supply fuel to the metering means, means operated by said metering means to close the first mentioned valve and open the second mentioned valve to supply a measured quantity of fuel to the burner, means to vary the amount of fuel available in the metering means, and means responsive to temperatures outside the refrigerator to operate said last mentioned means to vary the amount of fuel available in the metering means.

11. In combination with a refrigeration device of the intermittent absorption type, including an evaporator and a generator heated by a liquid fuel burner, a metering means, a fuel supply connected to said metering means by a fuel supply line, a valve interposed in the fuel supply line, means to connect the metering means to the burner including a second valve, means responsive to a predetermined increase in temperature in said evaporator to open said first valve to supply fuel to the metering means, means operated by said metering means to close the first mentioned valve and open the second mentioned valve to supply a measured quantity of fuel to the burner, and means to vary the amount of fuel available in the metering means, said last-mentioned means being both thermostatically responsive to temperatures outside the refrigeration space and adapted to be independently and manually varied.

12. In combination with a refrigeration device of the intermittent absorption type, including an evaporator and a generator heated by a liquid fuel burner, a metering means, a fuel supply connected to said metering means by a fuel supply line, a valve interposed in the fuel supply line, means to connect the metering means to the burner including a second valve, means responsive to a predetermined increase in temperature in said evaporator to open said first valve to supply fuel to the metering means, means operated by said metering means to close the first mentioned valve and open the second mentioned valve to supply a measured quantity of fuel to the burner, means to vary the amount of fuel available in the metering means comprising a movable inlet interposed in the connecting means between the metering means and the burner, and means responsive to temperatures outside the refrigeration space to move said inlet.

JOHN LITHGOW.
LESLIE K. JACKSON.